July 24, 1962 R. C. ALLEN 3,045,901

CHANGE-COMPUTING CASH REGISTER WITH FLAG CONCEALING MECHANISM

Filed Sept. 2, 1958 7 Sheets-Sheet 1

INVENTOR:
RALPH C. ALLEN
BY
Marzall, Johnston, Cook & Root
ATT'YS

July 24, 1962 R. C. ALLEN 3,045,901

CHANGE-COMPUTING CASH REGISTER WITH FLAG CONCEALING MECHANISM

Filed Sept. 2, 1958 7 Sheets-Sheet 2

INVENTOR:
RALPH C. ALLEN
BY Marzall, Johnston, Cook & Root
ATT'YS

July 24, 1962 R. C. ALLEN 3,045,901

CHANGE-COMPUTING CASH REGISTER WITH FLAG CONCEALING MECHANISM

Filed Sept. 2, 1958 7 Sheets-Sheet 3

*INVENTOR:*

RALPH C. ALLEN

BY Margall, Johnston, Cook + Root

ATT'YS

July 24, 1962 R. C. ALLEN 3,045,901

CHANGE-COMPUTING CASH REGISTER WITH FLAG CONCEALING MECHANISM

Filed Sept. 2, 1958 7 Sheets-Sheet 4

INVENTOR:
RALPH C. ALLEN
BY
Marzall, Johnston, Cook & Root
ATT'YS

INVENTOR:
RALPH C. ALLEN
BY Marzall, Johnston, Cook & Root
ATT'YS

INVENTOR:
RALPH C. ALLEN
BY
Margall, Johnston, Cook & Root
ATT'YS

July 24, 1962 R. C. ALLEN 3,045,901
CHANGE-COMPUTING CASH REGISTER WITH FLAG CONCEALING MECHANISM
Filed Sept. 2, 1958 7 Sheets-Sheet 7
FIG. 12
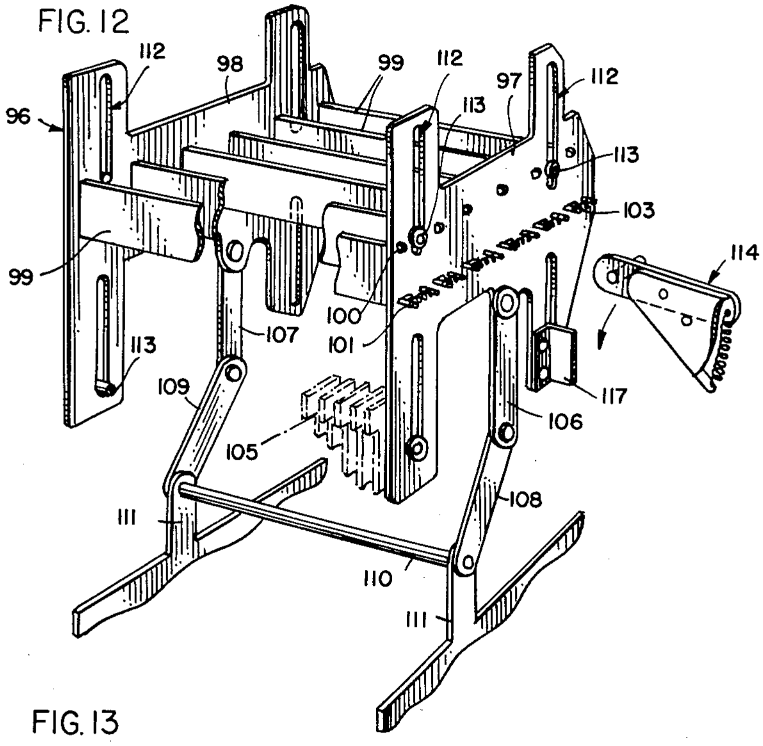
FIG. 13
| TRANSACTION | KEYS PUNCHED | FLAGS SHOWING | TAPE PRINTS |
|---|---|---|---|
| ITEM A | $2 + .50 + MB | 2.50 | 2.50 |
| " B | .40 + .02 + MB | .42 | .42 |
| " C | .08 + MB | .08 | .08 |
| " D | $1 + .20 + .05 + MB | 1.25 | 1.25 |
| " E | .70 + .05 + MB | .75 | .75 |
| " F | $1 + .50 + MB | 1.50 | 1.50 |
| SUB TOTAL | ST | ST 6.50 | ST 6.50 |
| AMT. TENDERED & CHANGE RETURN | AT + $10 + T | 0.00<br>0.00 | AT 10.00<br>CR 3.50 |
FIG. 14
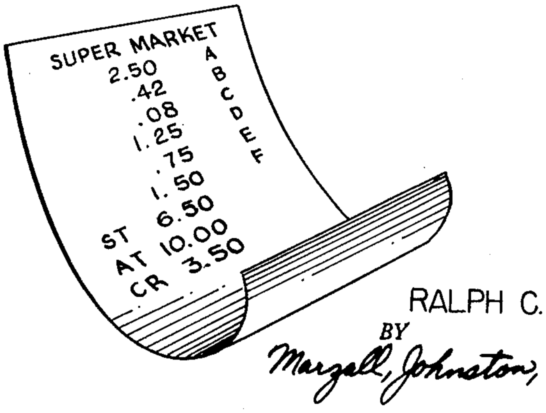
INVENTOR:
RALPH C. ALLEN
BY
Marzall, Johnston, Cook & Root
ATT'YS 3,045,901

CHANGE-COMPUTING CASH REGISTER WITH FLAG CONCEALING MECHANISM

Ralph C. Allen, Holland, Mich., assignor to R. C. Allen Business Machines, Inc., Grand Rapids, Mich., a corporation of Michigan Filed Sept. 2, 1958, Ser. No. 758,320
6 Claims. (Cl. 235—2)

This invention relates to a cash register of the itemizing type, and more particularly to a cash register having a visual indicating mechanism.

The cash register of the present invention is adapted for use in retailing establishments where a customer will in all likelihood buy a plurality of items of different costs. In this situation, the customer generally desires to check the itemizing of his goods as they are registered by the operator, and for this purpose the customer will generally closely watch the visual indicating mechanism. The cash register of the present invention includes a visualizing mechanism for the customer's convenience whereby a close check of the register operation may be made by the customer. Additionally, the present invention includes a printing mechanism which prints each item as it is registered on a paper tape, and subsequently prints any tax or miscellaneous charges and the total amount of the purchases thereby furnishing a receipt to the customer for his purchases. After the total amount has been calculated, the customer will tender a certain amount of money covering the total, which amount may be equal to the total, but generally is greater than the total. When the amount tendered is greater than the total, it is necessary for the operator to return a certain amount of change to the customer. Unless this change is calculated by the machine, the element of human error enters, and mistakes will be made, many of which are costly to the management of the retailing establishment. Accordingly, the cash register of the present invention will register the amount tendered, calculate the difference between that amount and the amount of total purchases, and register the amount of change to be returned to the customer.

Heretofore, cash registers have accomplished this result but in all cases illustrated in the visualizing mechanism the amount tendered and the amount of change to be returned, which can be seen by anyone within visual range of the cash register. This is undesirable since a person may not wish that his neighbor know the amount tendered, especially if it is a periodic paycheck; and larcenous persons with the felonious intent of obtaining money may be observing for purposes of knowing how much money a person is carrying.

The present invention overcomes this defect in the heretofore developed cash registers by disconnecting the visual indicating mechanism during the time the amount tendered transaction is being registered on the machine and the amount of change to be returned is calculated by the machine, although at the same time printing these transactions on the tape or receipt to be given to the customer. Thus, one's neighbor or a feloniously intent person will not be the recipient of information which would tend to deprive one of his rightful belongings, privacy and safety.

The present invention will include the various tabulating keys, department keys, subtotal and total keys, correction key, motor bar key and an amount tendered key, although other keys may also be provided. After a number of items have been recorded and added, the subtotal key may then be punched for placing the subtotal on the visual indicating mechanism for observation. When the amount tendered is received from the customer, this amount is indexed on the keyboard and the amount tendered key is punched. The total key is then punched which puts the machine through a first cycle of operation which subtracts the subtotal from the amount tendered and prints the amount tendered on the tape, while a second cycle prints the balance or amount of change to be received on the tape. During the time that these cycles of operation take place the visual indicating mechanism is disconnected, whereby the amount tendered and the amount of change to be returned does not appear for observation on the visual indicating mechanism.

Accordingly, it is an object of this invention to provide an improved cash register of the itemizing type.

Another object of this invention is in the provision of an itemizing cash register having a visual indicating mechanism and mechanism for registering the amount tendered and calculating the amount of change to be received, whereby the latter transactions may not be observed on the visualizing mechanisms.

Still another object of this invention is to provide an itemizing cash register having a visual indicating mechanism, mechanism for subtotaling a number of items, the registering of each item being observable by the visual indicating mechanism, and mechanism for registering an amount tendered on the machine and calculating the difference between it and the subtotal for determining the amount of change to be returned to a customer, whereby the visual indicating mechanism is disconnected during the amount tendered transaction and the amount of change to be returned transaction, although these transactions are printed on a paper tape to be given to the customer.

A further object of this invention resides in the provision of an itemizing cash register having a visual indicating mechanism for illustrating the registering of the itemized amounts and totals, mechanism for registering an amount tendered by a customer and calculating the difference between it and the amount of change to be returned, and means for deactivating the visual indicating mechanism during the amount tendered and change return transactions, while recording these transactions on a paper tape, thereby preventing this information from being in the hands of unauthorized or larcenous persons and reducing the wear on the visual indicating mechanism during these machine transactions.

Other objects, features, and advantages of the invention will be apparent from the following detailed disclosure, taken in conjunction with the accompanying sheets of drawings, wherein like reference numerals refer to like parts, in which:

FIG. 12 is a perspective view of the restoring means with parts of the mechanism broken away and removed to show underlying parts for purposes of clarification;

FIG. 13 is a chart illustrating the operation of the present invention; and

FIG. 14 is a perspective view of a tape section removed from the machine which constitutes the receipt for the customer and illustrates what transactions are recorded on the receipt.

Figure 1:
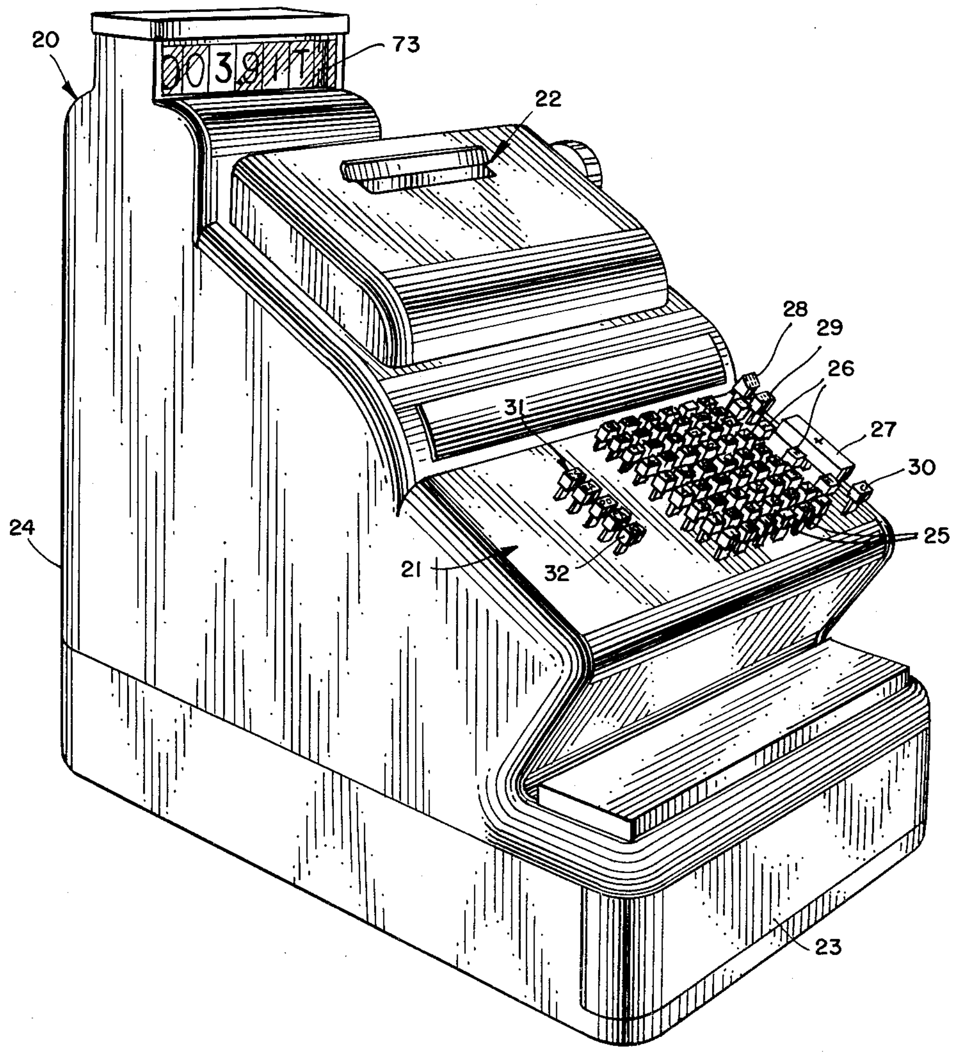
FIG. 1 is a perspective view of a cash register embodying the invention.
Figure 2:
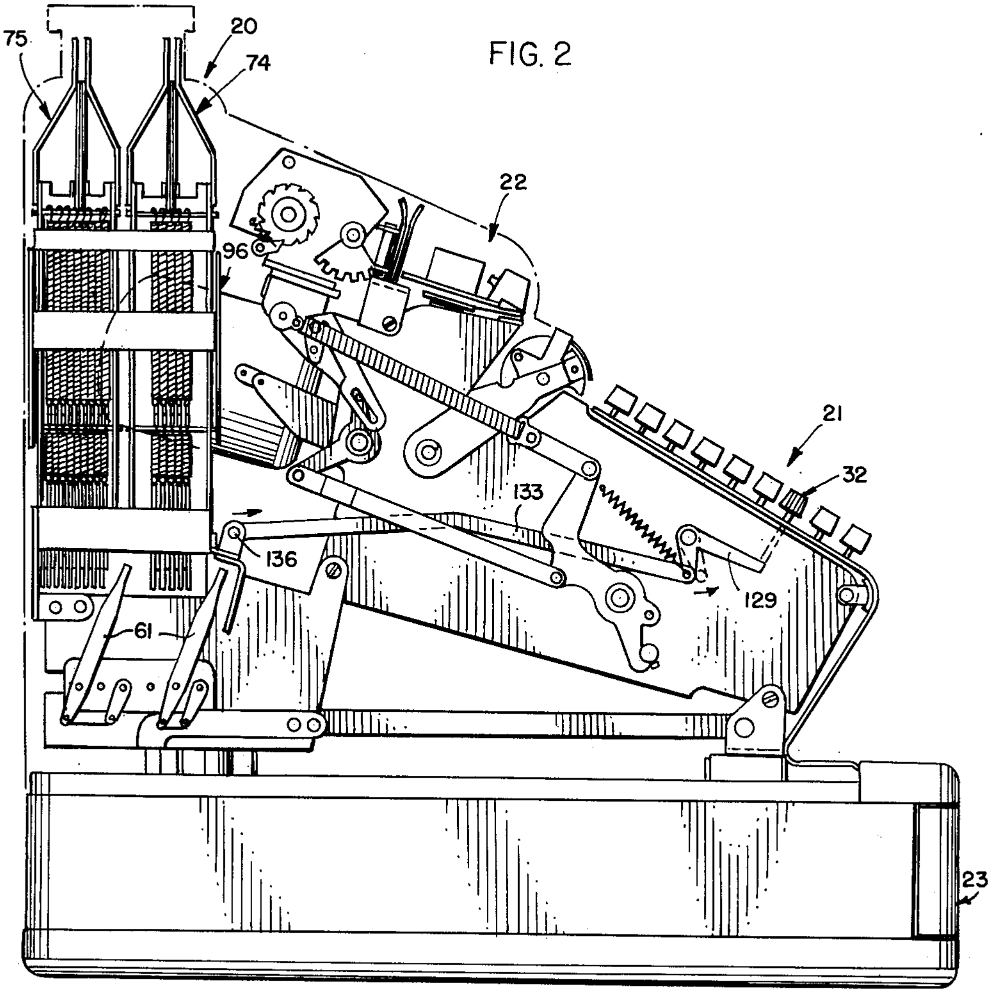
FIG. 2 is a side elevational view of the cash register with the side plate removed.

Referring now to the drawings, and especially to FIGS. 1 and 2, the cash register illustrating the present invention includes generally a visual indicating mechanism 20, a keyboard 21, a printing mechanism 22, a cash drawer 23, and a housing 24, wherein all transactions may be indexed on the keyboard and recorded by the printing mechanism and most of the transactions may be observed by the visual indicating mechanism.

The keyboard 21, FIG. 1, includes a plurality of banks of tabulating or amount keys 25, a bank of department or merchandise class keys 26, a motor bar or add bar key 27, a subtotal key 28, a total key 29, a correction key 30, and a bank of special transaction keys 31, including an amount tendered key 32. All transactions are initially indexed on the keyboard before being registered with the machine and recorded by the printing mechanism 22. At the choosing and needs of the customer, changing of the number of banks of tabulating keys and the symbols of the other keys may be made.

Although the printing mechanism 22 is not shown in detail, it will be understood that its components and operation will be like what is found in the R. C. Allen Itemizing Cash Register, Models 315 and 355, made and sold by R. C. Allen Business Machines, Inc. of Grand Rapids, Michigan. Accordingly, for purposes of clarity and since the printing mechanism per se forms no part of the present invention, its details have been omitted. However, it may be said that the transactions indexed and registered by the itemizing cash register of the present invention are recorded on paper tape by the printing mechanism 22 as illustrated in FIG. 14.

Figures 4, 5:
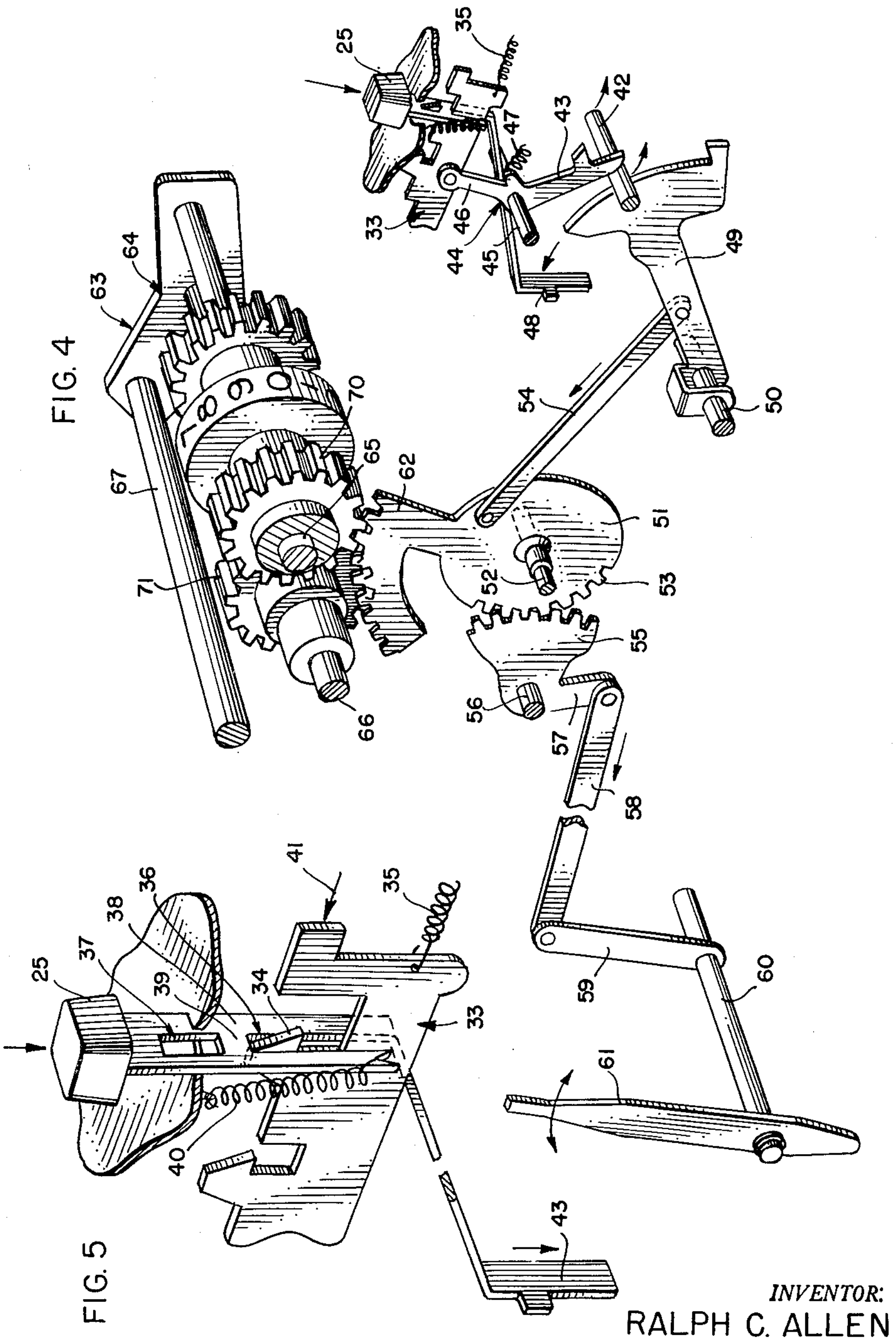
FIG. 4 is a perspective view of a tabulating key power train to the accumulator and the visual indicating mechanism.
FIG. 5 is a greatly enlarged detailed view of a tabulating key and mechanism holding the key in depressed or punched position.

Referring particularly to FIGS. 4 and 5, a latching mechanism including a sliding latch bar 33 having a hook or detent 34 and being normally biased to its position as shown by a spring 35, coacts with slots 36 and 37 of a keystem 38 of the tabulating key 25 to hold the tabulating key in depressed or punched position prior to activation of the machine by punching of the motor bar key or one of the total keys. The slots 36 and 37 define therebetween a crossbar 39 which engages the detent 34 in depressed position. A spring 40 is connected at the lower end of the keystem and to a stationary part of the machine for normally biasing the keystem and key to its out or up position. Upon depressing of the key 25, the keystem cams the latch bar 33 rearwardly in the direction of the arrow 41, FIG. 5, against the bias of the spring 35 until the detent 34 may pass through the upper slot 37 and return by the action of the spring 35 and lock the key in punched or depressed position. At the end of each cycle of operation, a release bar 42 strikes the arm 43 of a crank 44 pivoted on a shaft 45, FIG. 4. The crank 44 includes a second arm 46 pivotally connected to the latch bar 33. The crank 44 is urged by a spring 47 to slide the latch bar 33 to locking position. Thus, release of a key is accomplished when the release bar 42 is activated during the latter part of each cycle of operation. Hence, the keys are returned to their normal position after each cycle of operation.

Detection of a punched pattern of tabulating keys for registering is accomplished by an extension 48 of each keystem which blocks the path of movement of an oscillating detector arm 49, FIG. 4. The detector arm 49 is activated during the power stroke of the machine by rotation of the shaft 50 on which it is mounted. The detector arm in turn oscillates a disc 51, freely rotatably mounted on a shaft 52 and having a segmental gear section 53, through a link 54. In mesh with the segmental gear section 53 is a gear sector 55 pivotal on a shaft 56 and having an arm 57 pivotally connected to a link 58 leading to the visual indicating indexing mechanism. The link 58 is pivotally connected to a bar 59 rigidly secured to a transversely extending rod 60 having a flag actuating bar 61, the complete operation of which will be more clearly hereinafter described. It will be understood that the above described mechanism linking the tabulating keys with the visual indicating mechanism represents a single key from one of the many banks of tabulating keys. Accordingly, similar mechanisms will be provided for each bank of tabulating keys or any other bank of keys where a particular symbol is to be observed by the visual indicating mechanism. For example, if the tabulating key illustrated in FIG. 4 represented the numeral 5 on the bank of keys for indexing and recording dollars, punching of this key and the motor bar would effect raising of the flag in the visual indicating mechanism with the numeral 5 thereon and in a position to indicate $5.00.

The disc 51 carries a sector gear 62, FIG. 4, which registers the amount indexed on an accumulator 63 that serves to accumulate and store the items registered with the various transactions. Again, only a small part of the accumulator is illustrated for purposes of clarity, and in this instance the accumulator may be defined as a double accumulator of the type used in the credit balance adding machines, such as Models 715CB and 815CB made by R. C. Allen Business Machines, Inc. This accumulator permits adding or subtracting of an amount from a total stored in the accumulator, and permits a credit balance to be stored in the accumulator and printed on tape. For example, if a total stored amount in the accumulator is $6.50 and it is desired to find the difference between that figure and a larger figure such as $10, registering of the $10 and subtracting from the $6.50 results in a credit balance of $3.50.

Figure 6:
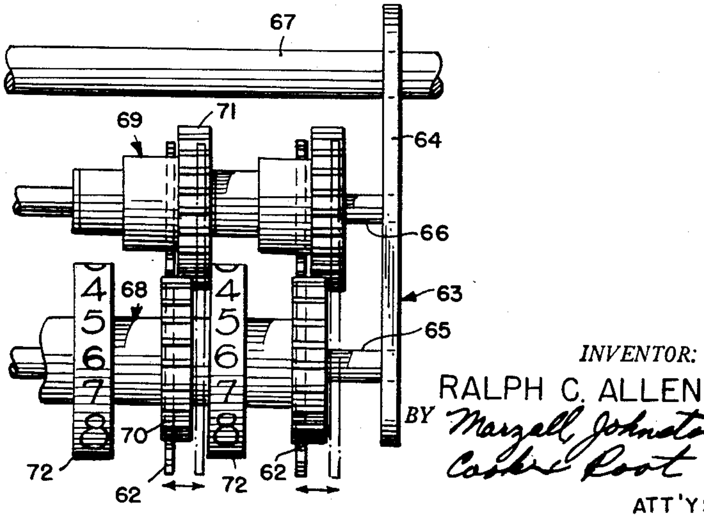
FIG. 6 is a top plan view of a portion of the double accumulator which performs the adding and subtracting operations.

Referring particularly to FIGS. 4 and 6, the accumulator includes opposite supporting plates 64 (only one shown) rotatably mounting therebetween front and rear accumulator shafts 65 and 66, respectively. The supporting plates are pivotally and slidably carried on a stationary cross rod 67 whereby the accumulator may pivot about the rod 67 and move axially therealong between two positions. The shafts 65 and 66, respectively, carry a plurality of front and rear dial gears 68 and 69, respectively, each including meshing gear sections 70 and 71, respectively. The gears sections are selectively engageable with the sector gear 62 depending upon the positioning of the accumulator along the rod 67. The dial gears 68 and 69 rotate in opposite directions whenever either dial gear is engaged by the sector by means of the meshing gear sections 70 and 71. Thus, rotation of the front dial gear 68 by the sector 62 rotates the rear dial gear 69 in an opposite direction, and rotation of the rear dial gear 69 by the gear sector 62 rotates the front dial gear 68 in an opposite direction and opposite the rotation of the front dial gear 68 when it is rotated by the gear sector 62. Each front dial gear 68, as seen in FIGS. 4 and 6, includes a numbered dial section 72 integral with the gear section and rotatable therewith. It will be understood that a plurality of dial gears 68, corresponding to the number of banks of tabulating keys are provided, each of which is associated with a rear dial gear as above described and illustrated in FIG. 6.

During the normal adding of an amount indexed, each gear sector 62 will engage the gear section 70 of each front dial gear 68 upon its return stroke (as seen in solid lines in FIG. 6) and add to the accumulated amount of the front accumulator shaft and place a debit balance in the accumulator. When a debit balance is stored in the accumulator, printing on the tape of a total or subtotal by the printing mechanism will be controlled by the front shaft. When the gear sector 62 engages the gear section 71 of the rear dial gear 69, the amount indexed is added on the rear accumulator shaft 66 and subtracted by the credit balance method from the front accumulator shaft. The accumulator 63 will shift to the left in FIG. 6 when the machine is performing a subtracting operation as would be caused subsequent to depressing the amount tendered key, and permit the gear sector 62 to engage the gear section 71 of the rear dial gear 69 (as shown in phantom lines of FIG. 6) instead of the front gear section 70. And if the amount subtracted is greater than the debit balance, the accumulator will carry a credit balance, so that printing on the tape of a total or subtotal by the printing mechanism will be controlled by the rear shaft. The printing mechanism always prints the balance, whether it be a credit or debit balance, and obtains this information from the accumulator. When a totalling operation takes place, the accumulator will be positioned at the right or left, depending on whether a debit or credit balance exists so that the accumulator will be read by the gear sector 62 at the front or back shaft. The printing mechanism is linked to shaft 52 (not shown) so that it will print according to the movement of the sector 62. Although the sector 62 is illustrated in solid and phantom positions in FIG. 6, it does not move between these positions. Rather the accumulator, including the shafts and dial gears, shifts to selectively permit engagement of the sector gear with the dial gear sections 70 and 71.

The visual indicating mechanism 20 is enclosed in a housing as seen in FIG. 1 which is provided with an observation window 73 at its upper end and at the front and back sides of the cash register. The cost amount of each item registered appears in the observation window, as well as any subtotal or total registered on the machine.

A plurality of banks of magazine assemblies, corresponding in number to the number of banks of tabulating keys and special keys provided on the keyboard, may be provided in the visual indicating mechanism. For purposes of illustration, six magazine assemblies, generally designated by the numerals 74, FIG. 11, may be provided. Since it is generally desirous to observe the itemized and total amounts from the front and back sides of the register, a second set of magazine assemblies, generally designated by the numeral 75, FIG. 2, may be provided directly behind the assemblies 74, but in reverse order relative to the corresponding banks of keys for illustrating the amounts itemized.

Figure 3:
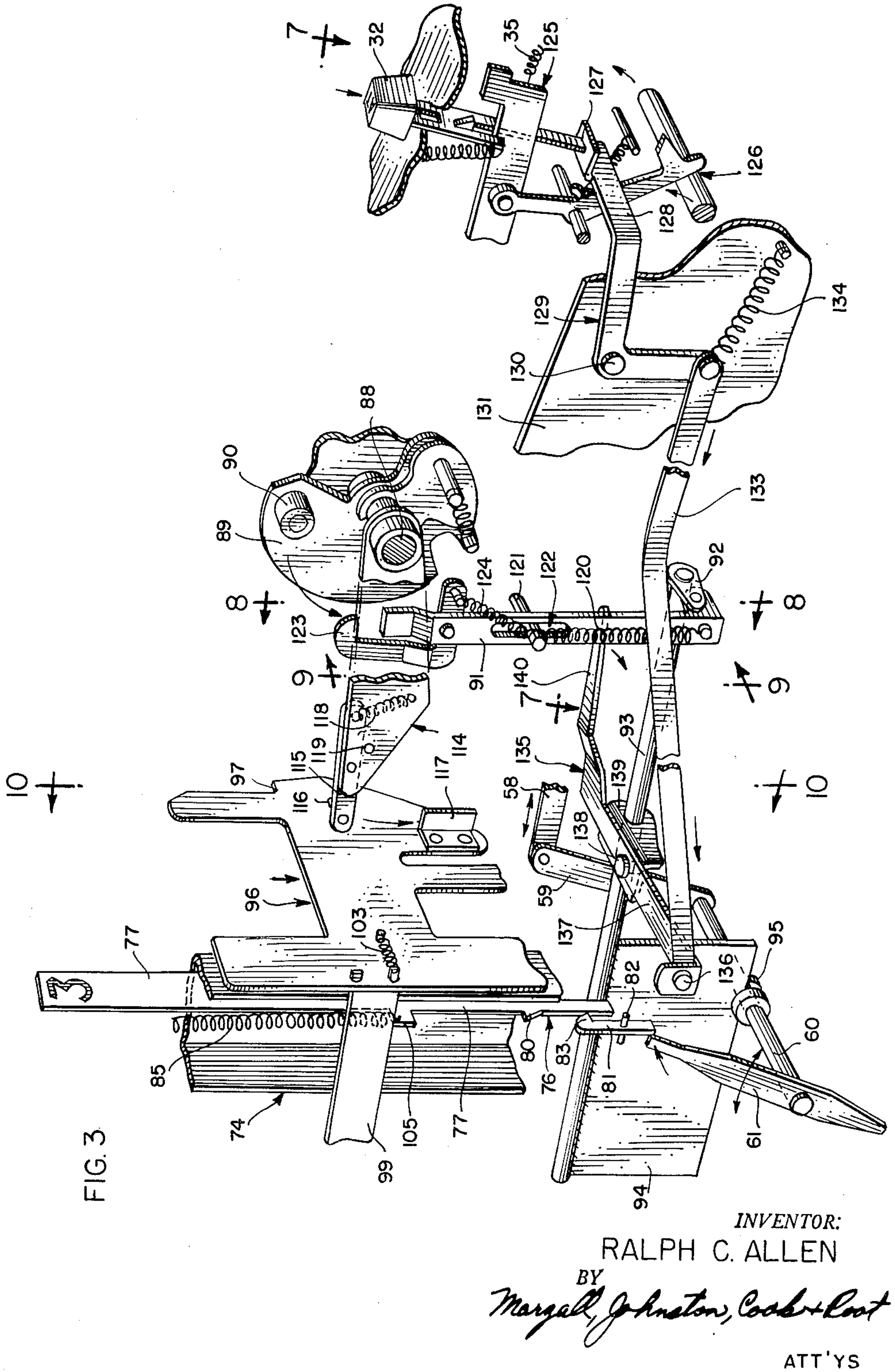
FIG. 3 is an enlarged perspective view of some of the operating parts illustrating the mechanism for deactivating the indicating mechanism.
Figures 7, 8, 9, 10:
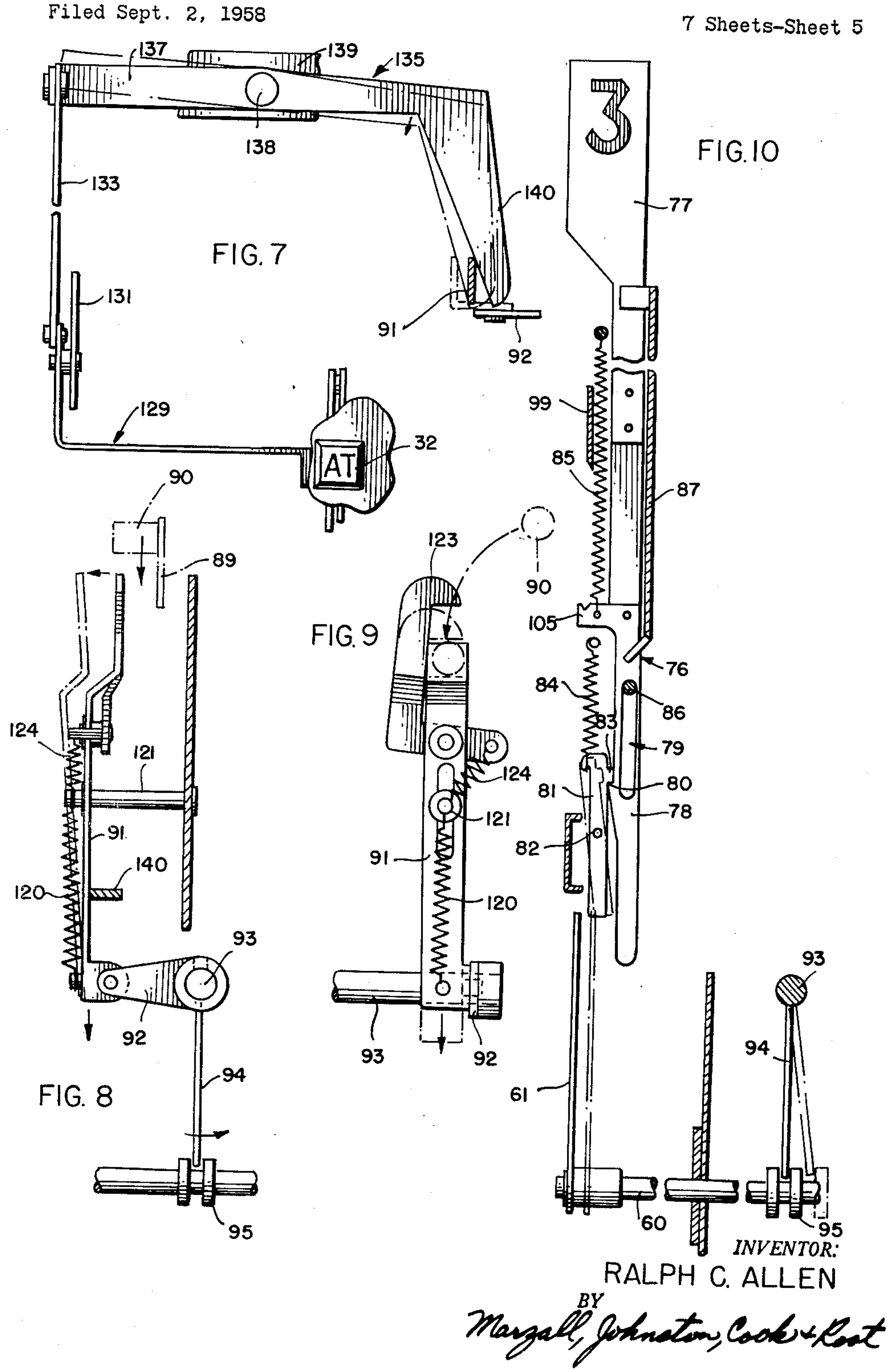
FIG. 7 is a broken top plan view of the visual indicating disconnect mechanism, taken substantially along line 7—7 of FIG. 3.
FIG. 8 is an enlarged front elevational view of a detailed part of the disconnect mechanism, taken substantially along line 8—8 of FIG. 3.
FIG. 9 is a side elevational view of the mechanism of FIG. 8 taken substantially along line 9—9 of FIG. 3.
FIG. 10 is a detailed enlarged elevational view of a single flag and associated mechanism taken from the visual indicating mechanism substantially along line 10—10 of FIG. 3.

Each magazine assembly includes a plurality of flag assemblies, generally designated by the numerals 76, FIGS. 3 and 10, and corresponding in number to the number of keys in a bank of keys. Each flag assembly 76 includes a flag 77 having a symbol printed thereon, an elongated extension 78, slotted at 79 and provided with a detent at 80, FIG. 10, and a latch bar 81 pivoted at 82 and having a latch detent 83. The latch bar 81 is normally biased by a spring 84 so that the latch detent 83 engages the detent 80 on the flag extension 78. Thus, the flag is normally held by the latch bar in down position.

Upon pivoting of the latch bar 81 the flag 77 and extension 78 will be urged upwardly to its up position by means of a spring 85, FIG. 10. A stationary pin 86 received in the flag extension slot 78 determines its upward and downward limit of movement. Suitable guiding mechanism 87 controls the vertical path of movement of the flags 77.

Release of a flag for it to appear in the observation window 73 is accomplished by the flag release bar 61 carried on the indexing rod 60, there being indexing rods and flag release bars for each magazine assembly. After the indexing rod has indexed the flag release bar into proper position, the indexing rod is shifted axially (as seen in solid and dotted lines of FIG. 10), whereby the flag release bar 61 engages and pivots the latch bar 81 to release the flag 77 and permit the spring 85 to carry the flag to its upward position. Shifting of the indexing rod 60 is accomplished by operation of the main power shaft 88, FIG. 3, during each cycle of registering operation. An actuating disc 89 having a roller 90 thereon oscillates with the power shaft 88 and engages the upper end of a reciprocating link 91, FIGS. 3 and 9, thereby urging downwardly the link 91 upon rotation of the shaft in a counterclockwise direction as viewed in FIG. 3. The lower end of the link 91 is pivotally connected to a plate 92 rigidly secured on one end of a shifting rod 93, FIG. 3. A shifting bar 94, FIGS. 3, 8 and 10, is secured to the shifting rod 93 axially thereof and engages a split collar 95 secured to the indexing rod 60. Actually, a plurality of indexing rods will parallel each other, each of which will have a slit collar thereon in engagement with the shifting bar 94. Therefore, during each normal cycle of operation of the register, the power shaft 88 effects shifting of the indexing rods for powering the visual indicating mechanism.

Figure 11:
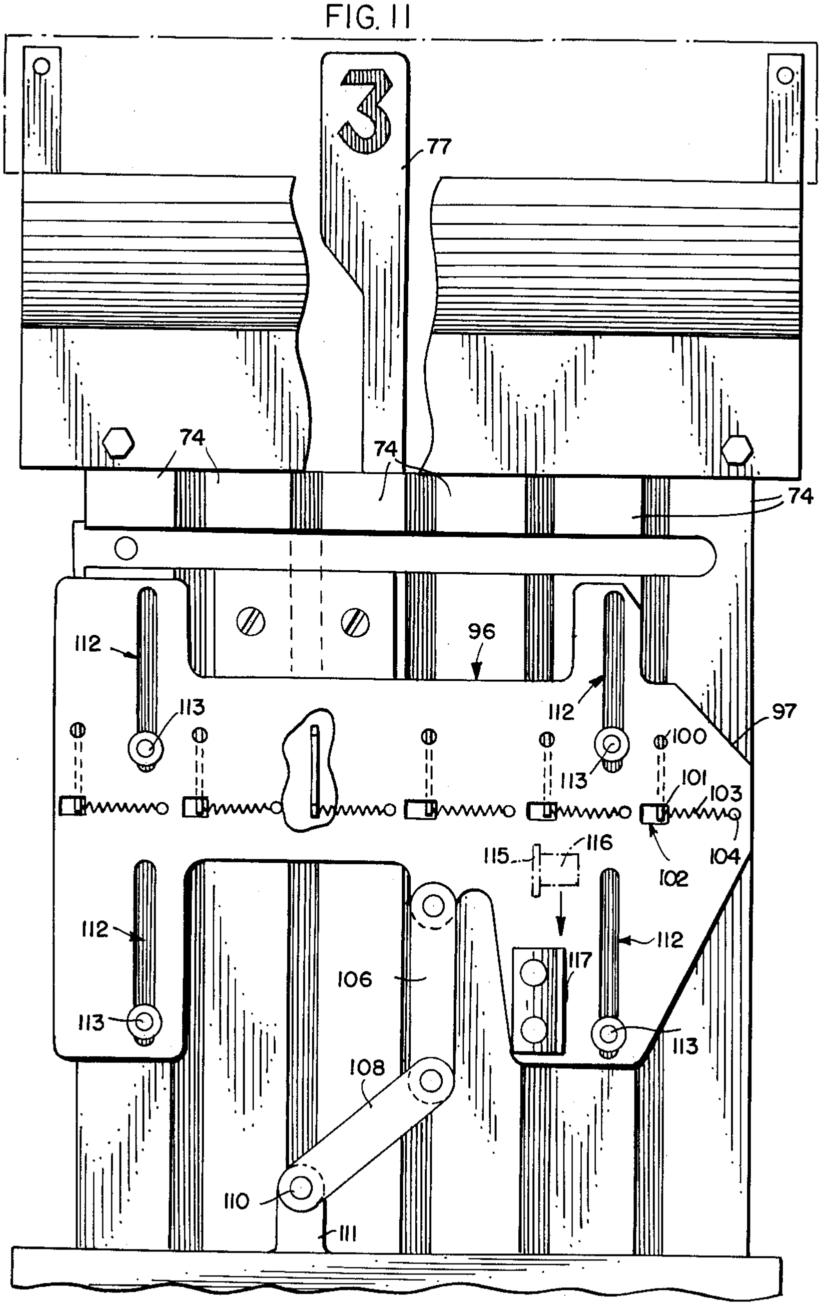
FIG. 11 is a front elevational view of the visual indicating mechanism and illustrating the restoring means.

Prior to actuation of the flag actuating link 91, the previously actuated flags 77 in the upper position are restored to their down position by means of the flag restoring mechanism, generally indicated by the numeral 96, FIGS. 3, 11 and 12. The flag restoring mechanism 96 includes front and back identically shaped frame members 97 and 98 arranged respectively on the front side of the magazine assemblies 74 and on the back side of the magazine assemblies 75. The frame members 97 and 98 are interconnected by a plurality of parallel arranged flag engaging bars 99 transversely spaced and extending between magazine assemblies. Each flag engaging bar 99 is provided with pintles 100 at each end and along the upper side which are received in apertures of the frame members 97 and 98 and which provide a pivot point for the bars. Lugs 101 extend from the opposite ends of each bar and along its lower side which are received in apertures 102, FIG. 11, of each frame member. Springs 103 have one of their ends connected to a lug 101 and the other end connected to a fixed pin 104 on the frame member in order to bias the bar in a counterclockwise direction about its pivot axis along the pintles 100. Upon downward movement of the restorer mechanism 96, each bar 99 will engage along its lower edge a projection 105 provided on each flag extension 78, FIG. 10, if the corresponding flag is in up position. The restorer mechanism returns the flag to its down position so that the latch bar 81 may then engage the detent 80 and hold the flag in its down position.

To further assure that the frame members carrying the flag engaging bars operate in unison, a connecting linkage is provided, FIG. 12, which includes links 106 and 107 pivotally connected at one end respective to the frame members 97 and 98 and at the other ends to links 108 and 109 respectively. The other ends of the links 108 and 109 are rigidly fastened to a connecting rod 110 pivotally mounted in spaced bearing plates 111. Each frame member is provided with a plurality of guide slots 112 arranged vertically and slidably receiving guide pins 113 mounted on some of the magazine assemblies. Thus, the restoring mechanism in its entirety reciprocates along a guided vertical path in order to assure proper resetting or restoring of the flags in their down position.

Operation of the restoring mechanism 96 is accomplished during oscillation of the power shaft 88 by means of a restoring mechanism arm 114 secured to the power shaft for movement therewith, FIG. 3. The arm 114 pivotally carries a bar 115 having a pin 116 extending laterally from its outer end and in the path of a projection 117 fixed to the front frame member of the restoring mechanism, FIGS. 3, 11 and 12. The arm 114 is arranged relative to the actuating roller 90 on the disc 89 whereby the restoring operation of the restoring mechanism 96 takes place in advance of actuation of the flag actuating link 91. The pin 116, during its downward movement, engages the projection 117, urging the restoring mechanism 96 downwardly against the force of the spring 85 until all of the flags have been reset to latched position, and then further downward movement of the pin 116 carries it out of engagement with the projection 117 in order to permit the restoring mechanism to return to normal position, whereby the flag engaging bars 99 will now permit release of the flags to their upper position upon further rotation of the power shaft 88 and actuation of the flag actuating link 91. In order to permit passage of the pin 116 by the projection 117 upon return movement of the power shaft 88 and restoring mechanism arm 114, the bar 115 may pivot against the action of a spring 118 connected at one end to the arm 114 and at the other end to one end of the bar 115. After the pin passes the projection 117, the spring 118 returns the bar 115 to its normal position against a stop 119, FIG. 3, so that it is now ready for the next cycle of operation. Referring again to the flag actuating link 91, it is restored to its upper normal position by means of a spring 120 connected at one end to the link 91 and at the other end to a stationary guide pin 121 extending through a slot 122 in the link 91. Although the indexing rod 60 and the link 91 are biased to a normal position, a finger 123 is pivotally mounted on the upper end of the link 91 to engage the roller 90 during its return stroke. The roller 90 may leave the confines of the finger 123 by camming it about its pivot against the action of a spring 124 connected at one end to the finger 123 and at the other end to the stationary guide pin 121.

During the registering of the amount tendered transaction and the amount of change to be returned transaction, the visual indicating mechanism 20 is deactivated or disconnected so that these transactions do not appear in the observation window 73. This is accomplished by depressing the amount tendered key 32, FIGS. 3 and 7, which is held in depressed position by a latching mechanism 125 of the same type as the latching mechanism associated with the tabulating keys. The same type of release mechanism 126 for releasing the key 32 from depressed or punched position is utilized, except that the release mechanism operates after two cycles of operation of the machine thereby maintaining the amount tendered key in punched position for two cycles of operation. The keystem of the amount tendered key 32 engages a pad 127 carried on a laterally extending leg of a crank arm 129. The crank arm is pivoted at 130 to a stationary frame part 131 and in turn is pivotally connected at 132 to one end of a push-pull link 133. A spring 134 is connected at one end to the stationary frame part 131 and at the other end to the push-pull link 133 biasing it normally to the right as seen in FIG. 3. The other end of the link 133 is pivotally secured to one end of a substantially L-shaped lever 135 at 136. The lever 135 includes a leg 137 intermediately pivoted at 138 to a stationary frame part 139. The lever 135 also includes a leg 140 angularly disposed to the leg 137 and arranged to engage one side of the flag actuating link 91, as seen in FIGS. 3 and 10. Thus, depressing or punching of the amount tendered key 32 rocks the crank arm 129 about its pivot thereby pushing forward the push-pull link 133 which in turn pivots the lever 135 to urge the flag actuating link 91 from its solid line position in FIG. 8 to its dotted line position and out of the path of the actuating disc roller 90, whereby oscillation of the actuating disc roller 90 will not effect actuation of the flag actuating link 91 thereby maintaining the visual indicating mechanism 20 deactivated or disconnected from the power shaft 88. Shifting of the flag actuating link 91 to the dotted line position in FIG. 8 permits the guide pin 121 to maintain the path of movement therealong.

An illustrated example of the operation of the present invention is shown in FIGS. 13 and 14 wherein, upon ascertaining the cost of Item A by the register operator, the \$2.00 and the 50¢ tabulating keys are punched and the motor bar is then punched, causing the \$2.50 item to be registered on the machine, wherein the \$2.50 purchase will appear in the observation window 73 and be printed on the paper tape as seen in FIG. 14. Similarly, with the registering of the Items B, C, D, E and F, the flags will show the cost of these items in the observation window and they will be printed on the paper tape as seen in FIG. 14. During these adding operations, the visual indicating mechanism 20 will be connected to the operation of the machine. By then punching the subtotal key 28, the subtotal of \$6.50 will appear in the observation window 73 and be printed on the paper tape as seen in FIG. 15. The purchaser then tenders an amount of money to cover his purchase. Exemplary of such an amount, the tendering of \$10 will be indexed on the keyboard along with the amount tendered key and the total key. Punching of the amount tendered key will shift the position of the flag actuating link 91 whereby the actuating disc roller 90 on the power shaft will not engage the actuating link during its successive cycles of operation thereby effectively disconnecting the visual indicating mechanism during the amount tendered transaction. After the total key has been depressed, the register will make two cycles of operation. The first cycle registers the amount tendered in the accumulator and subtracts it from the front accumulator shaft while adding it into the rear accumulator shaft and then prints the amount tendered of \$10 on the tape as seen in FIG. 14. Inasmuch as a credit balance is now in the accumulator, this amount is printed on the tape during the second cycle of operation which constitutes the amount of change to be returned as seen in FIG. 14. During the second cycle of operation the flags also will not show in the observation window 73. As already explained, the amount tendered key remains punched until completion of the second cycle of operation. Accordingly, the information as to the amount tendered and the amount of change to be returned to the customer is maintained in private and only available to the operator and purchaser by observation of the paper tape, FIG. 14, which constitutes the receipt for the customer. This completely eliminates the possibility of this information being in the hands of an unauthorized person.

It will be understood that modifications and variations may be effected without departing from the scope of the novel concepts of the present invention, but it is understood that this application is to be limited only by the scope of the appended claims.

The invention is hereby claimed as follows:

1. In a cash register of the itemizing type having a visual indicating mechanism and a keyboard, said keyboard having a plurality of banks of tabulating keys, a sub-total key, a total key, an amount tendered key, and a motor bar key, mechanisms responsive to the punching of said keys, an accumulator for accumulating and storing the itemized amounts, means for activating said visual indicating mechanism, means for subtracting an itemized amount from said accumulator responsive to punching of a pattern of tabulating keys and said amount tendered key, and thereafter said total key, and means responsive to punching of the amount tendered key to actuate said subtracting means and to disconnect said visual indicating activating means.

2. In an itemizing cash register, a visual indicating mechanism for illustrating the registering of itemized amounts and totals, means for activating said visual indicating mechanism, a keyboard including a plurality of banks of tabulating keys, a sub-total key, a total key, an amount tendered key, and a motor bar key, mechanisms responsive to punching of said keys, an accumulator for accumulating and storing itemized registered amounts, means for subtracting an itemized amount from said accumulator responsive to punching of a pattern of tabulating keys and said amount tendered key, and thereafter said total key, and means responsive to punching of the amount tendered key to actuate said subtracting means and to disconnect said visual indicating activating means, whereby the amount tendered will not appear on the visual indicating means.

3. An itemizing cash register comprising a keyboard, a visual indicating mechanism having an observation window for observing the registering of itemized amounts and total transactions, means for activating said visual indicating mechanism, a printing mechanism for printing all of said transactions on a paper tape, an accumulator for accumulating and storing itemized transactions, sub-total and total mechanisms, a mechanism for subtracting the total in the accumulator from a subsequently itemized amount transaction, and means operable in response to operation of said subtracting mechanism for disconnecting said means for actuating said visual indicating mechanism during said subsequently itemized amount transaction so that it and the subtracted difference do not appear in the observation window although the latter transactions are recorded on the paper tape by the printing mechanism.

4. An itemizing cash register comprising a keyboard, a visual indicating mechanism having an observation window for observing the registering of itemized amounts and total transactions, means for activating said visual indicating mechanism, a printing mechanism for recording all transactions on a paper tape, a double accumulator capable of accumulating and storing itemized amount transactions and of subtracting an itemized amount from the accumulated amount in the accumulator, sub-total and total mechanisms, and means for disconnecting said means for actuating said visual indicating mechanism during the registering and subtracting of an itemized amount so that said itemized amount and the balance do not appear in the observation window.

5. An itemizing cash register comprising a keyboard including a plurality of banks of tabulating keys, a subtotal key, a total key, an amount tendered key, and a motor bar key, mechanisms responsive to punching of said keys, a visual indicating mechanism having an observation window for observing the registering of itemized amounts and total transactions, means for actuating said visual indicating mechanism during each cycle of operation, a printing mechanism for recording all transactions on a paper tape, a credit balance accumulator for accumulating and storing itemized amount transactions and for calculating the balance between a subsequently indexed amount and the accumulative total, and means responsive to the depressing of series of tabulating keys for said subsequently indexed amount together with the amount tendered key and thereafter the total key for disconnecting said means for actuating said visual indicating mechanism during the registering of said subsequently indexed amount and calculating of the balance so that it and the balance do not appear in the observation window.

6. An itemizing cash register comprising a keyboard including a plurality of banks of tabulating keys, a subtotal key, a total key, an amount tendered key, and a motor bar key, mechanisms responsive to punching of said keys, an oscillating power shaft, a visual indicating mechanism having a plurality of magazine assemblies and an observation window for observing the registering of itemized amounts and total transactions, each magazine assembly having a plurality of flags selectively movable into observation position in the observation window, means for activating the visual indicating mechanism and for releasing the flags to observation position, said activating means including a crank arm having an offset projection on said power shaft oscillatable therewith, a flag actuating link normally positioned in the path of said offset projection whereby actuation of said power shaft activates said visual indicating mechanism thereby releasing flags to observation position, a credit balance accumulator for accumulating and storing itemized amount transactions and for calculating the balance between a subsequently indexed amount and the accumulative total, and means responsive to punching a series of tabulating keys setting the subsequently indexed amount together with the amount tendered key and thereafter said total key for shifting said flag actuating link out of the path of said offset projection during the registering of said subsequently indexed amount and calculating transactions whereby such transactions do not appear in the observation window.

References Cited in the file of this patent

UNITED STATES PATENTS

| | | |
|---|---|---|
| 869,982 | Pfeifer | Nov. 5, 1907 |
| 998,602 | Cleal | July 25, 1911 |
| 1,279,053 | Werner | Sept. 17, 1918 |
| 1,592,468 | Shepard | July 13, 1926 |
| 2,853,232 | Goodbar et al. | Sept. 23, 1958 |
| 2,858,067 | Styner et al. | Oct. 28, 1958 |
| 2,950,047 | Barberis | Aug. 23, 1960 |